(12) United States Patent
Morra et al.

(10) Patent No.: US 10,831,825 B2
(45) Date of Patent: Nov. 10, 2020

(54) PREDICTING A CONCEPT PREDICTION FOR MEDIA

(71) Applicant: ZEFR, Inc., Venice, CA (US)

(72) Inventors: Jonathan Morra, El Segundo, CA (US); Oded Noy, Los Angeles, CA (US)

(73) Assignee: ZERF, Inc., Los Angeles, CA (US)

( * ) Notice: Subject to any disclaimer, the term of this patent is extended or adjusted under 35 U.S.C. 154(b) by 0 days.

(21) Appl. No.: 16/598,252

(22) Filed: Oct. 10, 2019

(65) Prior Publication Data

US 2020/0133975 A1 Apr. 30, 2020

Related U.S. Application Data

(60) Provisional application No. 62/752,905, filed on Oct. 30, 2018.

(51) Int. Cl.
| | |
|---|---|
| *H04N 9/80* | (2006.01) |
| *G06F 16/71* | (2019.01) |
| *G06N 3/08* | (2006.01) |
| *G06F 16/78* | (2019.01) |
| *G06Q 30/02* | (2012.01) |
| *G06Q 30/08* | (2012.01) |
| *G06F 16/738* | (2019.01) |
| *G06F 16/732* | (2019.01) |
| *H04N 5/93* | (2006.01) |

(52) U.S. Cl.
CPC ............ *G06F 16/71* (2019.01); *G06F 16/732* (2019.01); *G06F 16/738* (2019.01); *G06F 16/7867* (2019.01); *G06N 3/08* (2013.01); *G06Q 30/0277* (2013.01); *G06Q 30/08* (2013.01)

(58) Field of Classification Search
CPC .. G06F 16/7867; G06F 16/738; G06F 16/732; G06F 16/71; G06N 3/08; G06Q 30/0277; G06Q 30/08
USPC .......................... 386/241, 239, 278, 281, 248
See application file for complete search history.

(56) References Cited

U.S. PATENT DOCUMENTS

2014/0222529 A1* 8/2014 VanderLugt ....... G06Q 30/0276
705/12

* cited by examiner

*Primary Examiner* — Robert Chevalier
(74) *Attorney, Agent, or Firm* — Kunzler Bean & Adamson

(57) ABSTRACT

For predicting a concept prediction, a processor generates a review job that includes a review question and a corresponding expert concept prediction for an expert media set drawn from a media corpus. The processor generates media reviews from a plurality of reviewers using the review job for the expert media set. The processor extracts media features for the media of the media reviews. The processor trains a review model with the media reviews and corresponding media features. The processor predicts the concept prediction for media of the media corpus using the review model.

20 Claims, 21 Drawing Sheets

390

| Model Parameters 391 |
| Accuracy Threshold 393 |
| Sentiment Threshold 394 |
| Agreement Threshold 395 |

| Budget Requirements 221 |
| Placement Number 223 |
| Desired Spend 225 |
| Objective Function 227 |
| Constrained Optimization 229 |

FIG. 3H

PREDICTING A CONCEPT PREDICTION FOR MEDIA

CROSS-REFERENCE TO RELATED APPLICATIONS

This application claims priority to U.S. Provisional Patent Application No. 62/752,905 entitled "EXTRACTING SUBJECTIVE OPINIONS OF VIDEOS" and filed on Oct. 30, 2018 for Jonathan Mora, the entire contents of which is incorporated herein by reference.

FIELD

The subject matter disclosed herein relates to predicting subjective concept predictions for media.

BACKGROUND

Large quantities of media are difficult to accurately review.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 3G is a schematic block diagram illustrating one embodiment of system data;

FIG. 3H is a schematic block diagram illustrating one embodiment of constrained optimization data;

DETAILED DESCRIPTION

Figure 1A:
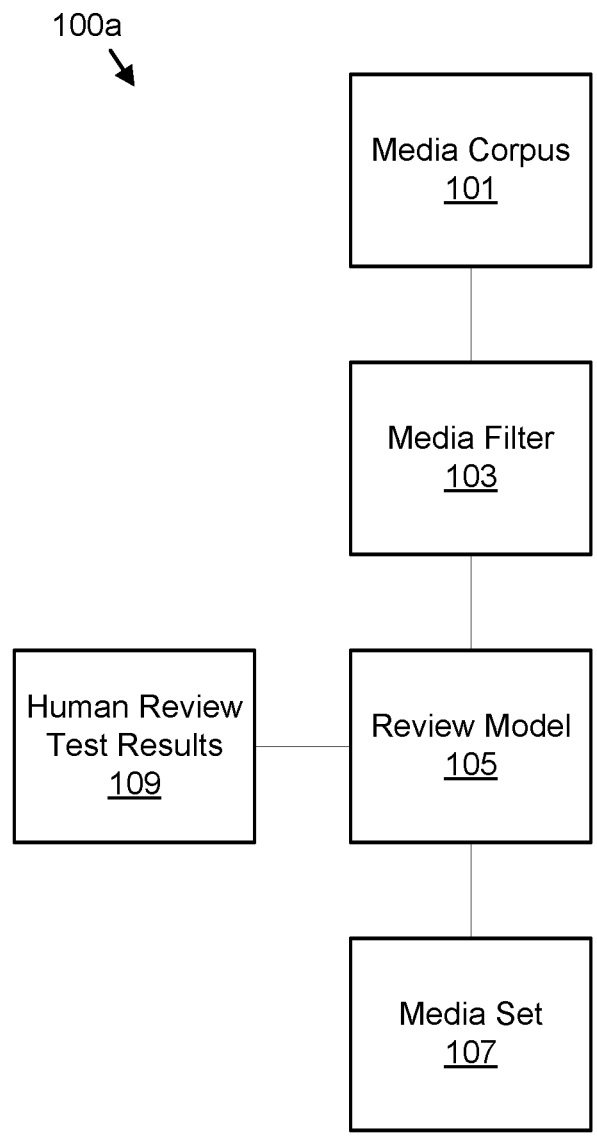
FIG. 1A is a schematic block diagram illustrating one embodiment of a review process.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom Very Large Scale Integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, R, Java, Scala, Java Script, Smalltalk, C++, C #, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Large numbers of media are difficult to accurately review. The embodiments allow expert opinions to be scaled and automated using machine learning.

FIG. 1A is a schematic block diagram illustrating one embodiment of a review process 100a. Many advertisers would like to present their offering to a wide audience, including in-front of streamed media content, for example—video media on platforms such as YOUTUBE® or FACEBOOK®. The advertiser would like to present their offering in a context that reflects their brand positioning. That context is both subjective and changes over time. In order to capture a subjective and changing context for a brand, there is a need to translate the brand's preferences into a media set 107 that will adhere to the brand's intent. Advertisements, promotions, offers, and the like may be presented along with presentations of a medium from the media set 107 to further the advertiser's goals.

In the past, the media set 107 has been manually selected from the media corpus 101, and/or selected based on easily quantifiable criteria such as the number of views, whitelists, blacklists, keyword targeting, and/or a number of likes. Unfortunately, such selection processes ignored highly suitable media and/or focused on media that was in more demand and so more costly. As a result, promotional opportunities with media that reflects a brand's context are regularly lost while promotional costs are often higher than needed.

The embodiments scale the review process 100a and translate the manual review process into an automated review process 100a as will be described hereafter. By automating the review process 100a, the embodiments allow for a larger media corpus 101 to be effectively reviewed. As a result, more suitable media may be identified. In addition, more suitable and/or cost-effective media may be identified. Thus the embodiments improve the efficiency of computer systems in selecting the media set 107 from the media corpus 101 for advertisers.

The review process 100a employs a review model 105 to review a media corpus 101 and select the media set 107. The review model 105 is trained using human review test results 109 so that the review model 105 accurately reflects the opinions of human reviewers. The human review test results 109 scale the opinions of experts such as advertisers to a large number of reviewers. The reviewers then generate a sufficient training set of media reviews that can be used to train the review model 105. As a result, the opinions of the few experts are scaled to the automated review model 105.

The review model 105 automatically reviews media from the media corpus 101 and generates a concept prediction for each medium. The concept prediction predicts how closely the theme of a medium reflects a brand positioning. For example, a medium about applying makeup may closely reflect the brand positioning of a cosmetic product. The concept prediction is used to select the media of the media set 107. Thus, promotions can be presented with the media of the media set 107 to promote and enhance a brand.

In one embodiment, the media of the media corpus 101 is initially filtered to identify media that are more likely to reflect the brand positioning. The review model 105 may then review this subset of the media corpus 101 and predict the concept prediction for the subset of the media corpus 101.

Figure 1B:
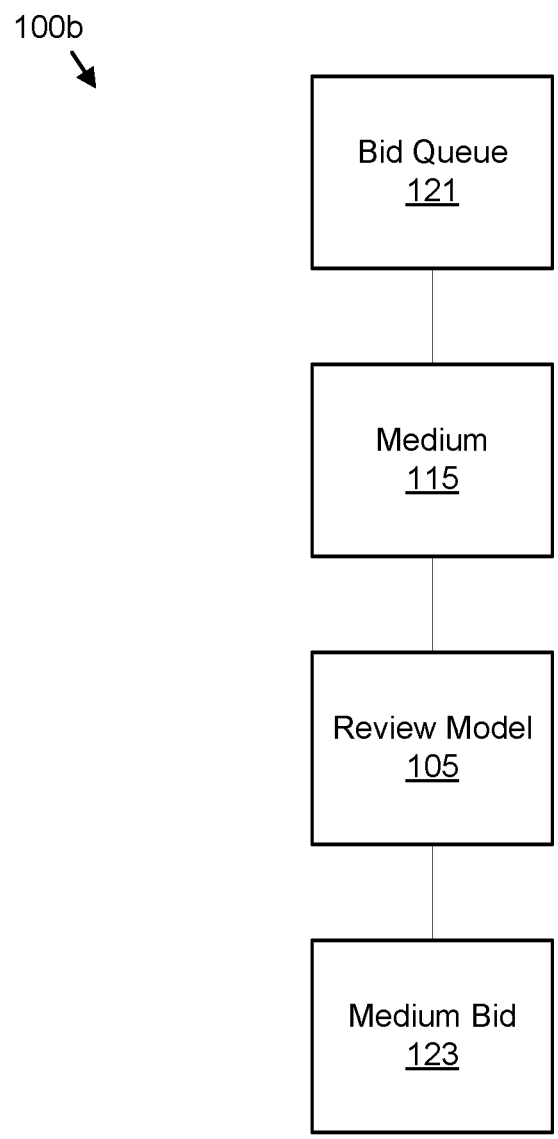
FIG. 1B is a schematic block diagram illustrating one alternate embodiment of a review process.

FIG. 1B is a schematic block diagram illustrating one alternate embodiment of a review process 100b. In the depicted embodiment, media that is about to be consumed is placed in a bid queue 121. For example, each video media that is about to be viewed on YOUTUBE® may be placed in the bid queue 121. A medium 115 may be selected from the bid queue 121 and reviewed by the review model 105. The review model 105 may predict the concept prediction for the medium 115 and store the concept prediction. The concept prediction may be used to generate a medium bid 123 that accurately reflects the value of presenting a promotion with the medium 115 to the advertiser.

Figure 1C:
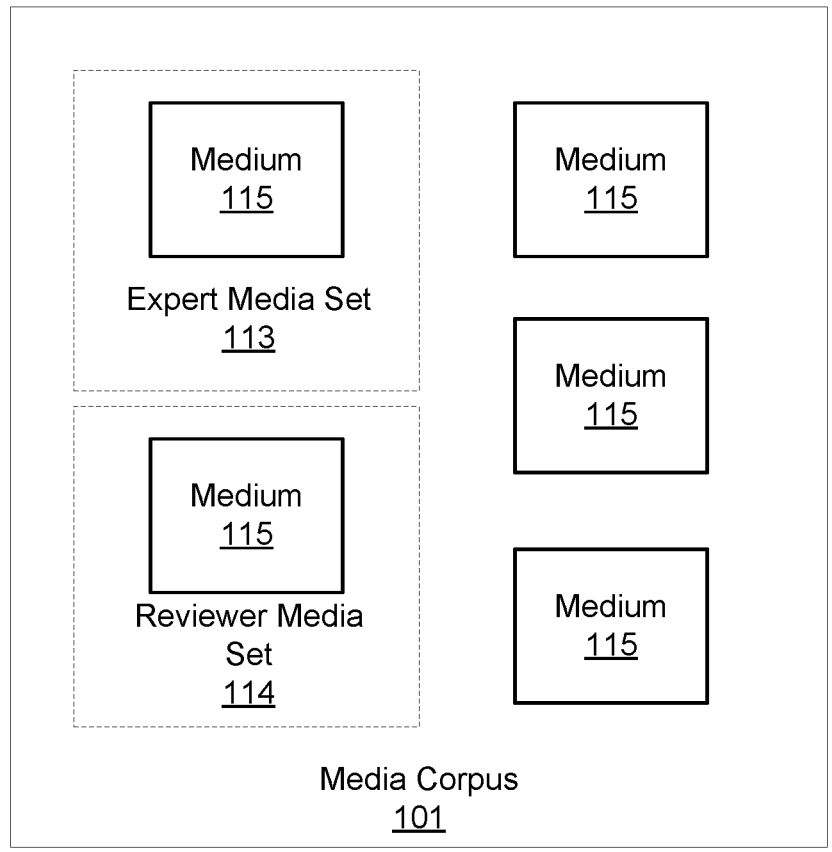
FIG. 1C is a schematic block diagram illustrating one embodiment of a media corpus.

FIG. 1C is a schematic block diagram illustrating one embodiment of the media corpus 101. In the depicted embodiment, the media corpus 101 includes a plurality of media 115. For simplicity, two media 115 are shown. However, the media corpus 101 may include many billions of individual medium 115. As a result, the media corpus 101 is too large for any person or group to manually review. As a result, the generation of lists such as blacklists and whitelists does not scale for a large media corpus 101. In the past, easily quantifiable metrics such as keywords, views, and likes have been used to make selections of the media 115. However, inaccuracies in the keywords and the like have often resulted in unsuitable media 115 being selected. In addition, media 115 suitable for promoting a brand may not be tagged with keywords that result in the media's selection.

The embodiments may employ an expert media set 113 to generate a review job that is used to generate a large number of reviewers trained in the opinions of the experts. The expert media set 113 may be a subset of the media corpus 101. The reviewers then generate a large number of concept predictions from a reviewer media set 114 selected from the media corpus 101 that is used to train the review model 105 as will be described hereafter. The reviewer media set 114 may be a subset of the media corpus 101. The reviewer media set 114 may be 10 to 100 times or more larger than the expert media set 113.

The expert media set 113 may be a subset of the media corpus 101. The expert media set 113 may be selected programmatically. For example, the expert media set 113 may be selected using active learning. The expert media set 113 may be manually selected. For example, the expert media set 113 may be a curated set of media 115 that is regularly presented to advertisers. Alternatively, the expert media set 113 may be randomly selected from the media corpus 101. In a certain embodiment, the expert media set 113 is selected using the media filter 103.

Figure 2:
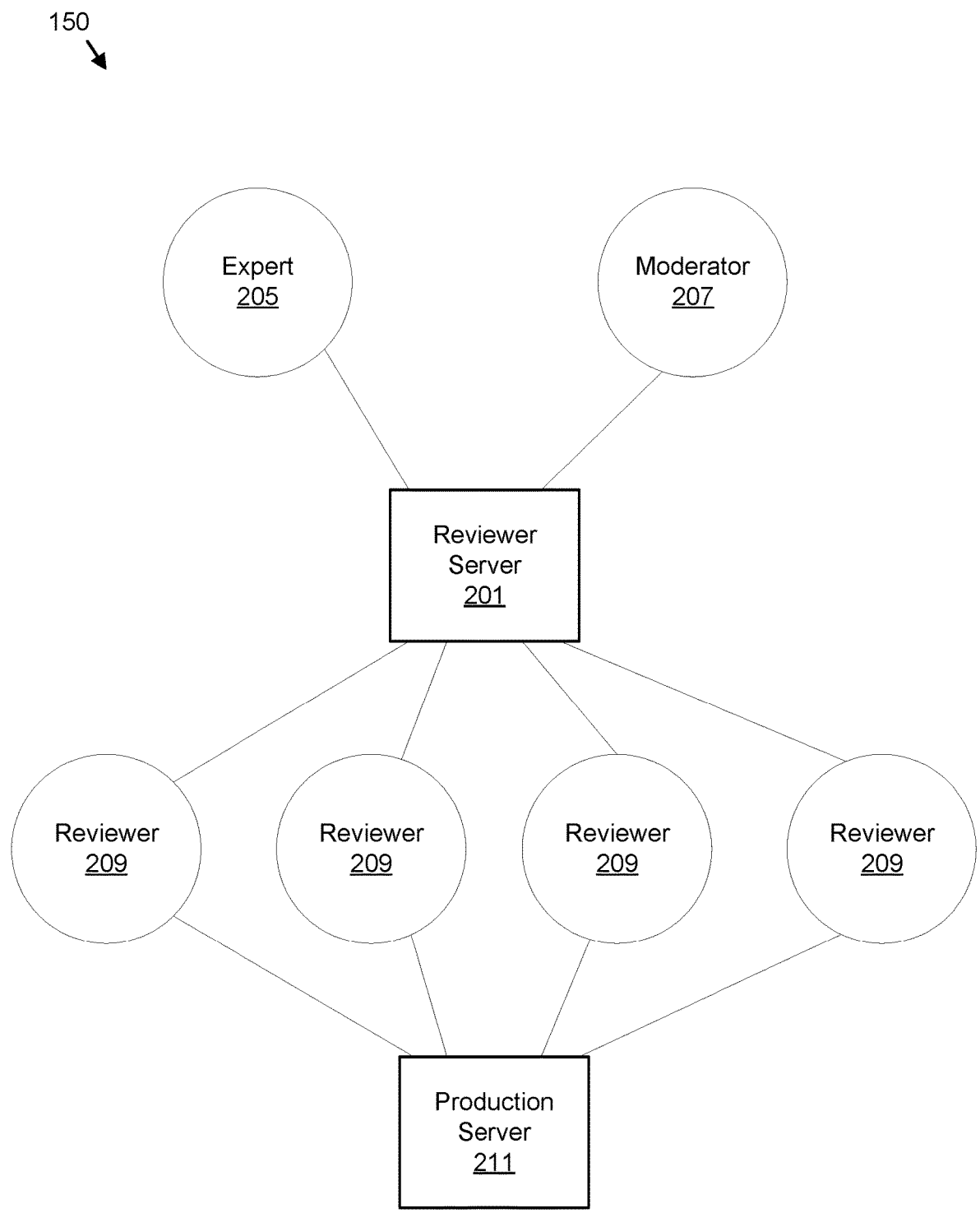
FIG. 2 is a schematic block diagram illustrating one embodiment of a review system.

FIG. 2 is a schematic block diagram illustrating one embodiment of a review system 150. The review system 150 may coordinate the expertise of one or more experts 205, moderators 207, and reviewers 209 in generating the human review test results 109 that are used to train the review model 105. In the depicted embodiment, the expert 205, moderator 207, and reviewers 209 communicate with the reviewer server 201. In addition, the reviewers 209 may communicate with the production server 211.

One or more experts 205 share a collective subjective opinion of media 115 in the media corpus 101. In one embodiment, the advertiser is the expert 205. In addition, the experts 205 may be selected by the advertiser. As a result, the experts 205 have a shared set of subjective preferences that reflect the advertiser's brand positioning.

The moderator 207 may be knowledgeable of the media corpus 101. In one embodiment, the moderator 207 is an automated process. The reviewers 209 may review media 115 from the media corpus 101 and answer objective questions about the media 115 to generate media reviews with concept predictions.

Unfortunately, the number of media 115 that should be reviewed to generate the human review test results 109 sufficient to train the review model 105 is typically larger than the number of media 115 the experts 205 are collectively willing to view. For example, an advertiser expert 205 may be willing to review the media 115 in the expert media set 113, but the expert media set 113 may not be large enough to effectively train the review model 105. As a result, the embodiments use expert concept predictions from the experts 205 using the expert media set 113 to select and train the plurality of reviewers 209. The plurality of reviewers 209 may then review the reviewer media set 114 and generate the human review test results 109 for training the review model 105 on the reviewer server 201. The review model 105 may then be hosted on the production server 211 and review the media corpus 101 and/or bid queue 121. In one embodiment, reviews from the reviewers 209 may periodically be used to retrain and/or refine the review model 105.

Figure 3A:
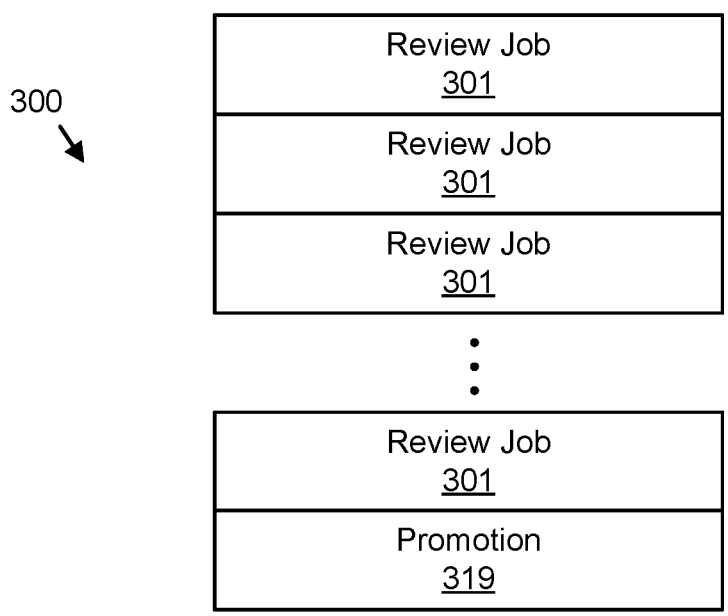
FIG. 3A is a schematic block diagram illustrating one embodiment of a review job database.

FIG. 3A is a schematic block diagram illustrating one embodiment of a review job database 300. The review job database 300 may be organized as a data structure in a memory. In the depicted embodiment, the review job database 300 comprises a plurality of review jobs 301. In one embodiment, the review job database 300 includes a promotion 319. The promotion 319 may record links to one or more promotional medium that may be presented along with a medium 115 to promote a brand's intent. The promotional media may include advertisements, coupons, universal resource locators (URL), and/or the like.

Figure 3B:
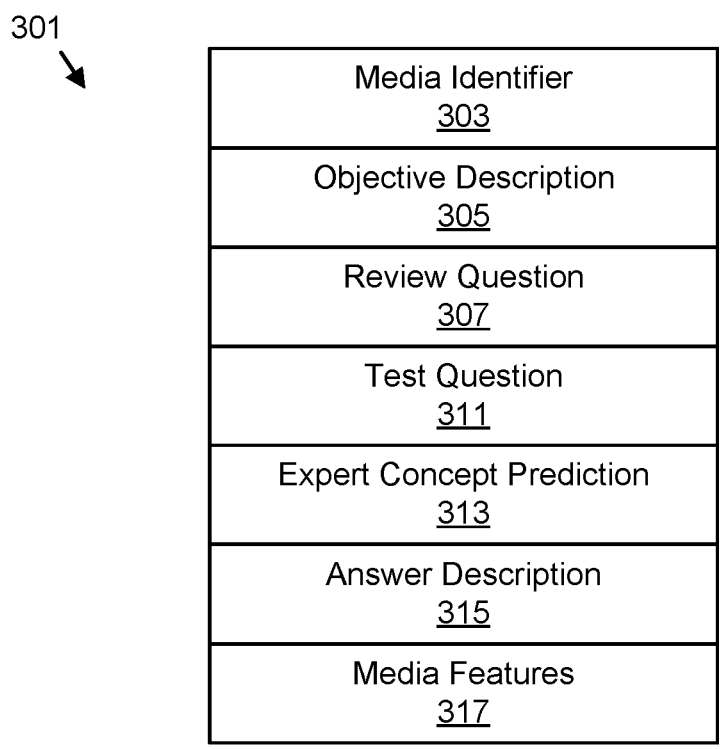
FIG. 3B is a schematic block diagram illustrating one embodiment of a review job.

FIG. 3B is a schematic block diagram illustrating one embodiment of a review job 301. Each review job 301 may be based on the opinions of an expert 205, including an expert concept prediction 313. In the depicted embodiment, the review job 301 includes a media identifier 303, an objective description 305, a review question 307, a test question 311, the expert concept prediction 313, an answer description 315, and media features 317.

The media identifier 303 may identify a medium 115 such as a video, audio, text, an image, and the like. The objective description 305 may describe the medium 115. The review question 307 may elicit the expert concept prediction 313 from the expert 205. For example, the review question 307 may ask "Is the current video representative of our brand identity?"

In one embodiment, the test question 311 comprises a question that validates the review question 307 and corresponding expert concept prediction 313. The answer description 315 may record additional details from the expert 205 regarding the expert concept prediction 313. For example, the answer description 315 may explain why the current video is representative of the brand identity. The media features 317 are described hereafter in FIG. 3J.

The review job 301 organizes data for efficiently generating the expert concept prediction 313 from an expert 205. Thus, the review job 301 enables a computer to accurately capture the expert concept prediction 313.

Figure 3C:
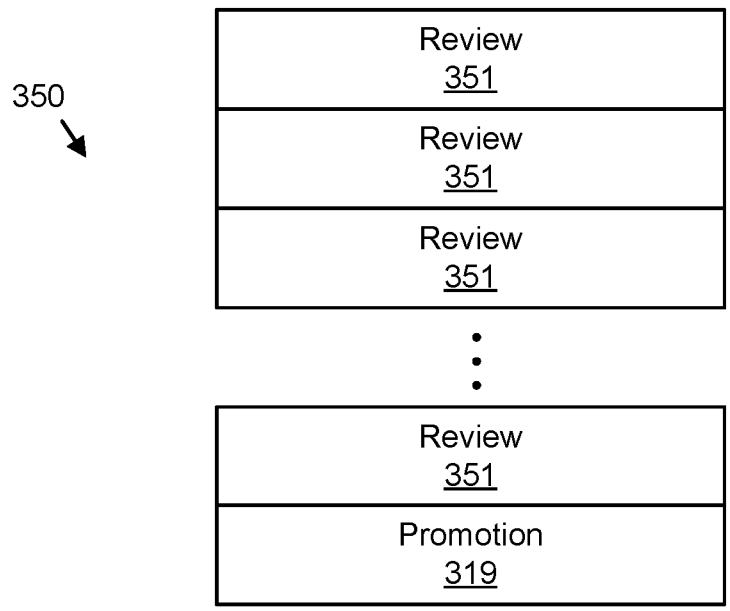
FIG. 3C is a schematic block diagram illustrating one embodiment of a review database.

FIG. 3C is a schematic block diagram illustrating one embodiment of a review database 350. The review database 350 may be organized as a data structure in a memory. In the depicted embodiment, the review database 350 includes a plurality of reviews 351. The review database 350 may also include the promotion 319.

Figure 3D:
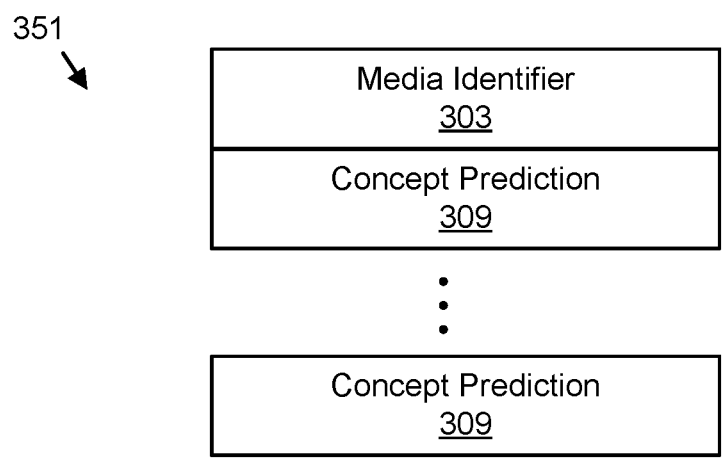
FIG. 3D is a schematic block diagram illustrating one embodiment of a review.

FIG. 3D is a schematic block diagram illustrating one embodiment of a review 351. The review 351 may be generated by a reviewer 209 in response to a medium 115 using the review job 301. In the depicted embodiment, the review 351 includes the media identifier 303 and one or more concept predictions 309. The media identifier 303 identifies the medium 115. The concept prediction 309 records the reviewer's answer to the review question 307 of the review job 301 regarding the medium 115.

Figure 3E:
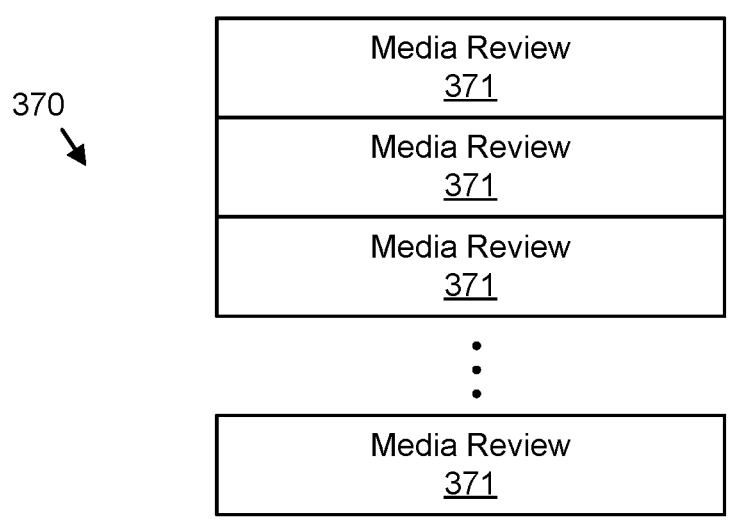
FIG. 3E is a schematic block diagram illustrating one embodiment of a media review database.

FIG. 3E is a schematic block diagram illustrating one embodiment of a media review database 370. The media review database 370 may be organized as a data structure in a memory. In the depicted embodiment, the media review database 370 includes a plurality of media reviews 371.

Figure 3F:
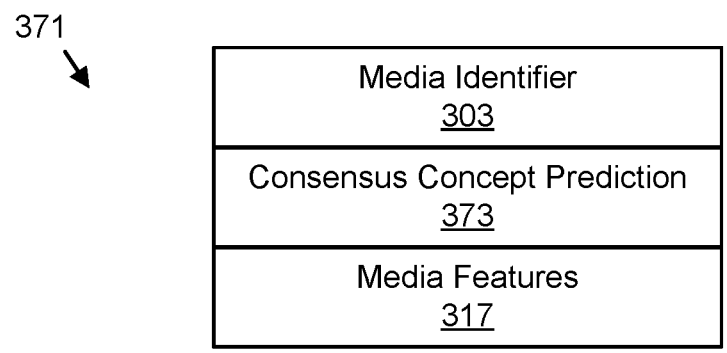
FIG. 3F is a schematic block diagram illustrating one embodiment of a media review.

FIG. 3F is a schematic block diagram illustrating one embodiment of a media review 371. The media review 371 may aggregate a plurality of reviews 351 for a medium 115. In the depicted embodiment, the media review 371 includes the media identifier 303, a consensus concept prediction 373, and the media features 317. The media identifier 303 identifies the medium 115. The consensus concept prediction 373 may be an average, a mean, a medium, a range, and the like of the concept predictions 309 of the plurality of reviews 351 for the medium 115.

FIG. 3G is a schematic block diagram illustrating one embodiment of system data 390. The system data 390 may be organized as a data structure in a memory. In the depicted embodiment, the system data 390 includes model parameters 391, an accuracy threshold 393, a sentiment threshold 394, and an agreement threshold 395. The model parameters 391 may specify parameters for training the review model 105. The model parameters 391 may include a model type, a model breadth, a model depth, a learning rate, a learning algorithm, a network geometry, and/or a recursion geometry.

The accuracy threshold 393 may be used to validate a review job 301, determine whether to regenerate the review job 301, and/or select reviewers 209 as will be described hereafter. The accuracy threshold 393 may be satisfied if the concept predictions 309 agrees with the expert concept predictions 313. The accuracy threshold 393 may be a percentage in the range of 70 to 100 percent.

The sentiment threshold 394 may be used to determine if a review question 307 elicits a valid expert concept prediction 313. The sentiment threshold 394 may be in the range of 60 to 100 percent positive sentiment. The agreement threshold 395 may be used to determine if a review job 301 used by reviewers 209 sufficiently reflects the expert concept prediction 313 of the expert 205. The agreement threshold 395 may be a probability of a null hypothesis of less than five percent. In addition, the agreement threshold 395 may be a probability given a prior of in the range of 0.7 to 1.0.

FIG. 3H is a schematic block diagram illustrating one embodiment of constrained optimization data 220. The constrained optimization data 220 may be organized as a data structure in a memory. The constrained optimization data 220 may be used to perform a constrained optimization as will be described hereafter in FIG. 5B. In the depicted embodiment, the constrained optimization data 220 includes budget requirements 221, a placement number 223, a desired spend 225, an objective function 227, and a constrained optimization 229.

The budget requirements 221 may specify a promotional budget of the promotion 319 for one or more specified time intervals. For example, the budget requirements 221 may specify a maximum promotional budget for a day and/or for a month. The placement number 223 may specify a number of media 115 with which to place the promotion 319. The desired spend 225 may specify an aggregate cost of placing the promotion 319 with media 115. The objective function 227 may relate the budget requirements 221, the placement number 223, the desired spend 225, and other factors. The constrained optimization 229 may specify values for one or more parameters as will be described hereafter.

Figure 3I:
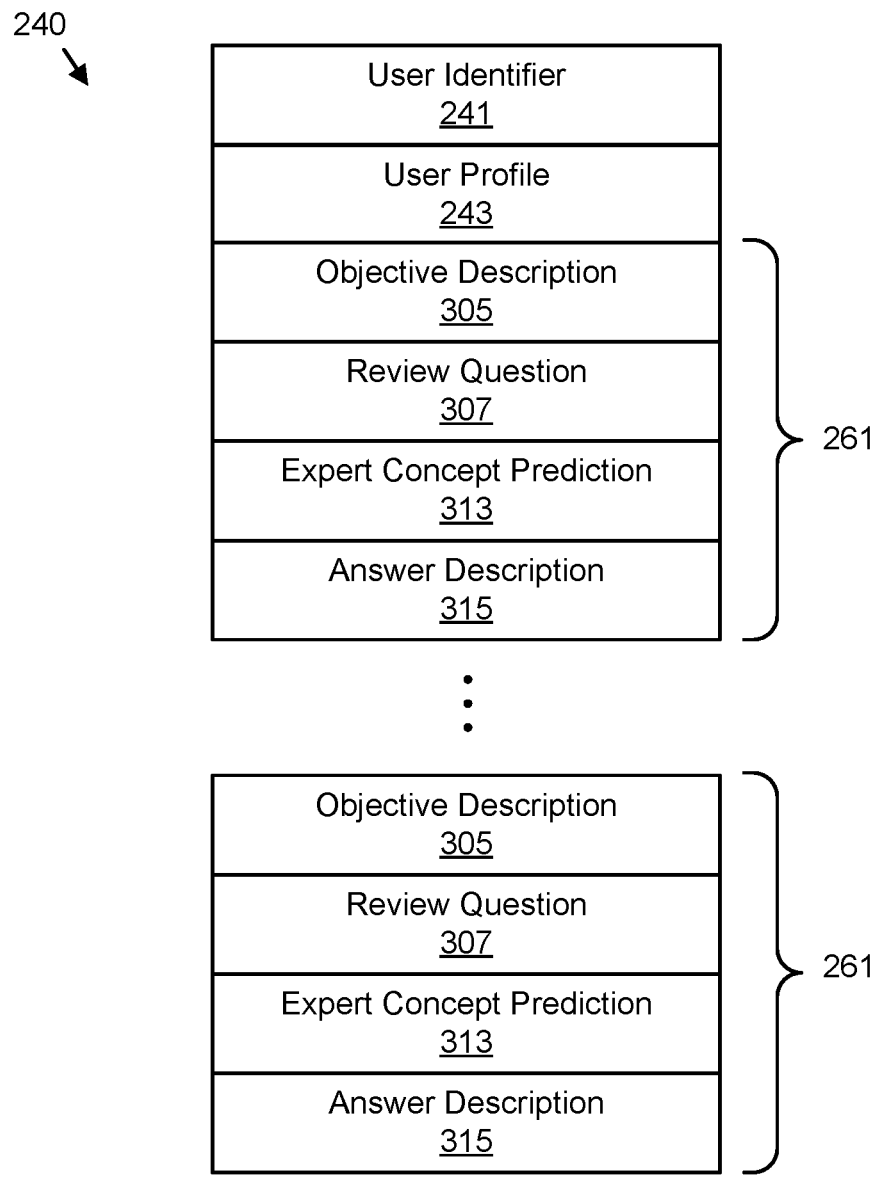
FIG. 3I is a schematic block diagram illustrating one embodiment of a preference format.

FIG. 3I is a schematic block diagram illustrating one embodiment of a preference format 240. The preference format 240 may be organized as a data structure in a memory. The preference format 240 may be generated from an expert 205. In addition, the preference format 240 may be used to generate a review job 301. In the depicted embodiment, the preference format 240 includes the user identifier 241, a user profile 243, and one or more review sets 261 that include the objective description 305, the review question 307, and the expert concept prediction 313. In one embodiment, the review sets 261 include the answer description 315.

Figure 3J:
FIG. 3J is a schematic block diagram illustrating one embodiment of media features.

FIG. 3J is a schematic block diagram illustrating one embodiment of the media features 317. The media features 317 may be organized a data structure in a memory. In the depicted embodiment, the media features 317 include media metrics 353, a media category 247, a text description 249, an image 251, text 253, a video 255, and audio 257. The media metrics 353 may record a number of views, a number of likes, comment sentiments, keywords, and the like for the medium 115. The media category 247 may specify one or more categories for the medium 115. The medium 115 may be embodied in the image 251, text 253, video 255, and/or audio 257.

The text description 249 may describe the medium 115. In one embodiment, the text description 249 includes keywords for the medium 115. The image 251 may record an image medium 115. In addition, the image 251 may record a representative image for the text 253, video 255 and/or audio 257. The text 253 may record a text medium 115. In addition, the text 253 may describe the image 251, the video 255, and/or the audio 257. The video 255 may record a video medium 115. In addition, the video 255 may describe the image 251, the text 253, and/or the audio 257. The audio 257 may record an audio medium 115. In addition, the audio 257 may describe the image 251, the text and 53, and/or the video 255.

Figure 4A:
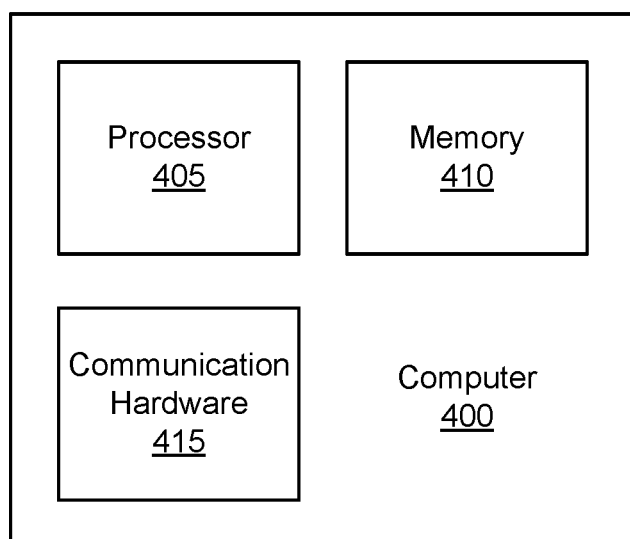
FIG. 4A is a schematic block diagram illustrating one embodiment of a computer.

FIG. 4A is a schematic block diagram illustrating one embodiment of a computer 400. In the depicted embodiment, the computer 400 includes a processor 405, a memory 410, and communication hardware 415. The memory 410 may include a semiconductor storage device, a hard disk drive, an optical storage device, a micromechanical storage device, or combinations thereof. The memory 410 may store code. The processor 405 may execute the code. The communication hardware 415 may communicate with other devices.

The processor 405 may train and/or execute the review model 105. The review model may be a Gradient Boosting Machine (GBM) model, a random forest model, and the like. The processor 405 may employ supervised learning or unsupervised learning to train the review model 105.

Figure 4B:
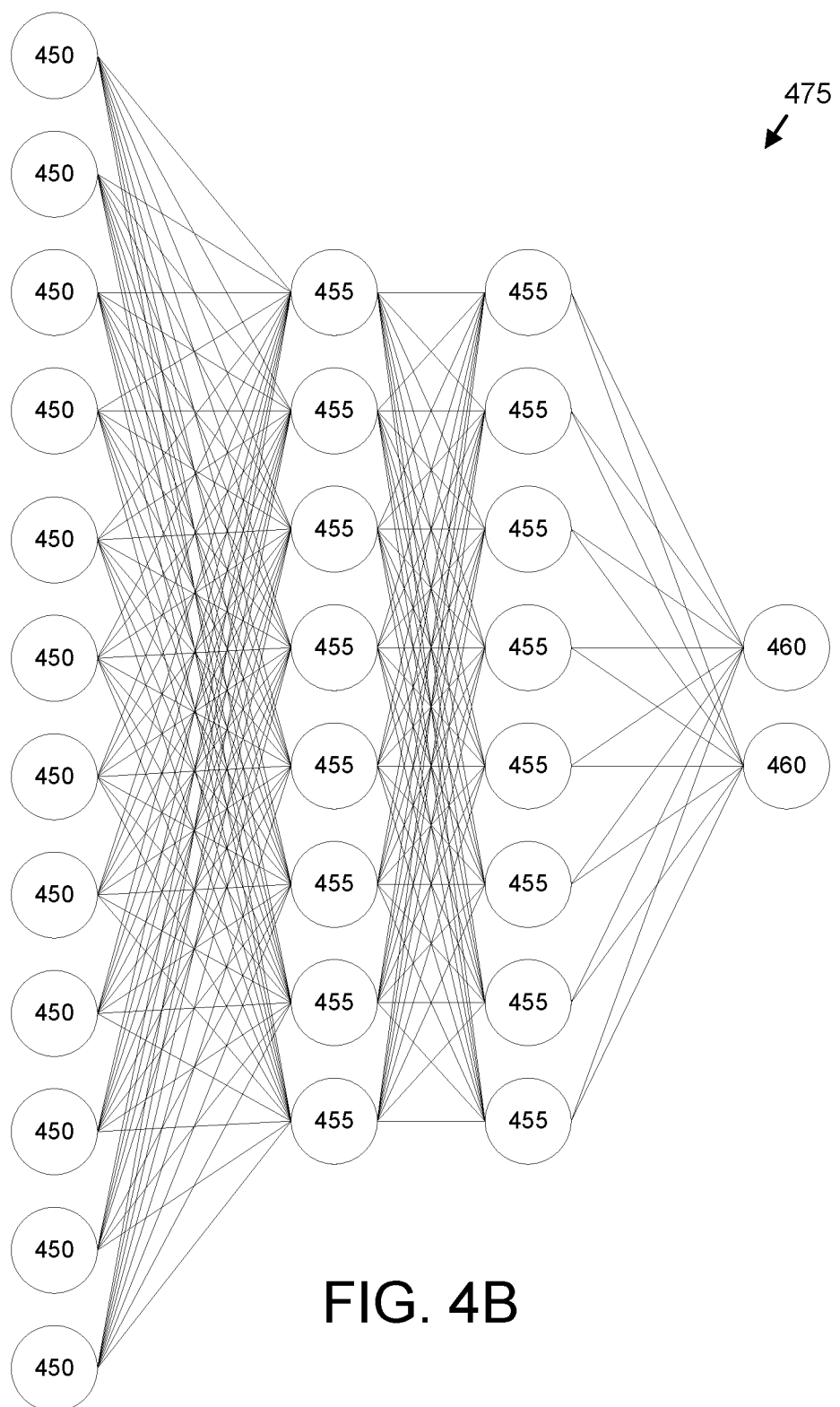
FIG. 4B is a schematic block diagram illustrating one embodiment of a neural network.

FIG. 4B is a schematic block diagram illustrating one embodiment of a neural network 475. In the depicted embodiment, the neural network 475 includes input neurons 450, hidden neurons 455, and output neurons 460. The neural network 475 may be organized as a convolutional neural network, a recurrent neural network, a long-short-term memory network, and the like.

The neural network 475 may be trained with training data. The training data may include the media reviews 371 of their media review database 370. The neural network 475 may be trained using one or more learning functions while applying the training data such as media features 317 to the input neurons 450 for unsupervised learning. In addition, known result values such as corresponding concept predictions 309 may be identified for the output neurons 460 for supervised learning. Subsequently, the neural network 465 may receive actual data such as the media features 317 at the input neurons 450 and make a concept prediction 309 at the output neurons 460 based on the actual data.

Figure 5A:
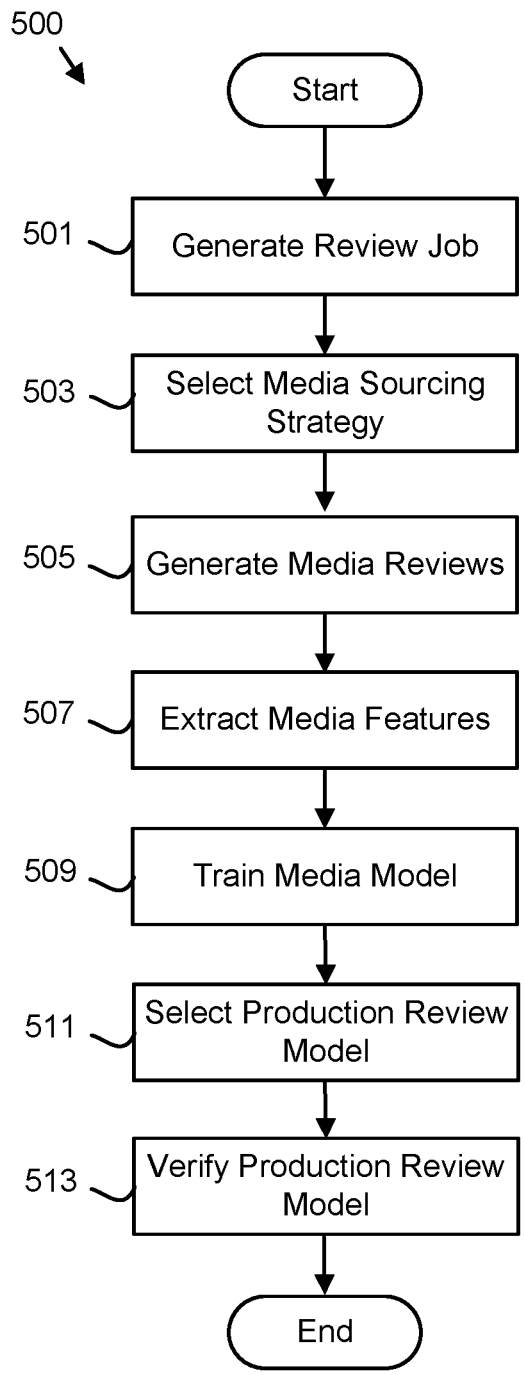
FIG. 5A is a flow chart diagram illustrating one embodiment of a model generation method 520.

FIG. 5A is a flow chart diagram illustrating one embodiment of a model generation method 500. The method 500 may generate the review model 105. The method 500 may be performed by the processor 405 and/or neural network 475.

The method 500 starts, and in one embodiment, the processor 405 generates 501 the review job 301 comprising at least one review question 307 and the corresponding expert concept prediction 313 for an expert media set 113 drawn from a media corpus 101. The review job 301 may be generated 501 from one or more experts 205. In addition, the review job 301 may be validated with one or more reviewers 209. The generation 501 of the review job 301 is described in more detail in FIG. 5C.

The processor 405 may select 503 a media sourcing strategy. The media sourcing strategy may be selected from the group consisting of a random strategy, an active learning strategy, and a targeted strategy. The random strategy selects media 115 at random. For example, the processor 405 may randomly select one or more media identifiers 303 from the media corpus 101.

The active learning strategy selects media 115 for review based on the concept prediction 309 from the reviewers 209 and/or interactive queries directed to reviewers 209. For example, the review model 105 may generate a concept prediction 309 for a candidate medium 115. The candidate medium 115 may be selected based on the concept prediction 309. In addition, the processor 405 may present the review question 307 for a candidate medium 115 to one or more reviewers 209 and receive the concept prediction 309 from the reviewers 209. The processor 405 may select the candidate medium 115 based on the concept predictions 309 from the reviewers 209. For example, media 115 may be selected where the concept prediction 309 is close to 0.5, indicating that the review model 105 is uncertain of an appropriate concept. In one embodiment, media 115 with concept predictions 309 that satisfy the objective description 305 are selected for review. In a certain embodiment, a "human in the loop" such as the expert 205 and/or moderator 207 may assist in selecting the media 115.

The target strategy selects media 115 based on media metrics 353. For example, the processor 405 may select media 115 with a specified keywords. The processor 405 may further select a set of media 115 based on the media sourcing strategy.

The processor 405 may generate 505 media reviews 371 from a plurality of reviewers 209 using the review job 301 for the expert media set 113. In one embodiment, the processor 405 presents the review job 301 to the reviewers 209 for each medium 115 in the reviewer media set 114 and receives the review 351 including the concept prediction 309 for the medium 115 from each reviewer 209. The concept predictions 309 may be aggregated in the consensus concept prediction 373 of the media review 371 for the medium 115. The generation 505 of the media reviews 371 is described in more detail in FIG. 5D.

The processor 405 may further extract 507 the media features 317 for the plurality of media reviews 371. In one embodiment, the processor 405 performs an automated review of the media 115 in the reviewer media set 114 to extract 507 the media features 317. The extraction 506 of the media features 317 is described in more detail in FIG. 5H.

The processor 405 may train 509 the review model 105. The processor 405 may train 509 the review model 105 with media reviews 371 and corresponding media features 317. In one embodiment, the review model 105 is trained 509 with a training data set of the media features 317 and corresponding concept predictions 309 for each medium 115 of the reviewer media set 114. The training 509 of the review model 105 is described in more detail in FIG. 5E.

In one embodiment, the review model 105 is retrained 509 with media 115 selected using the media sourcing strategy. The processor 405 may regularly retrain 509 the review model 105. In a certain embodiment, the review model 105 is retrained daily.

The processor 405 may select 511 a production review model 105. The production review model 105 may be selected 511 from one or more trained review models 105 and/or a current production review model 105. In one embodiment, each review model 105 is tested against the expert media set 113. The review model 105 that predicts concept predictions 309 that are closest to the expert concept predictions 313 of the review job 301 may be selected 511.

The processor 405 may verify 513 that the selected production review model 105 is production ready and the method 500 ends. The selected production review model 105 may be tested against a production subset of the media corpus 101 to verify 513 that the selected production review model 105 is production ready.

Figure 5B:
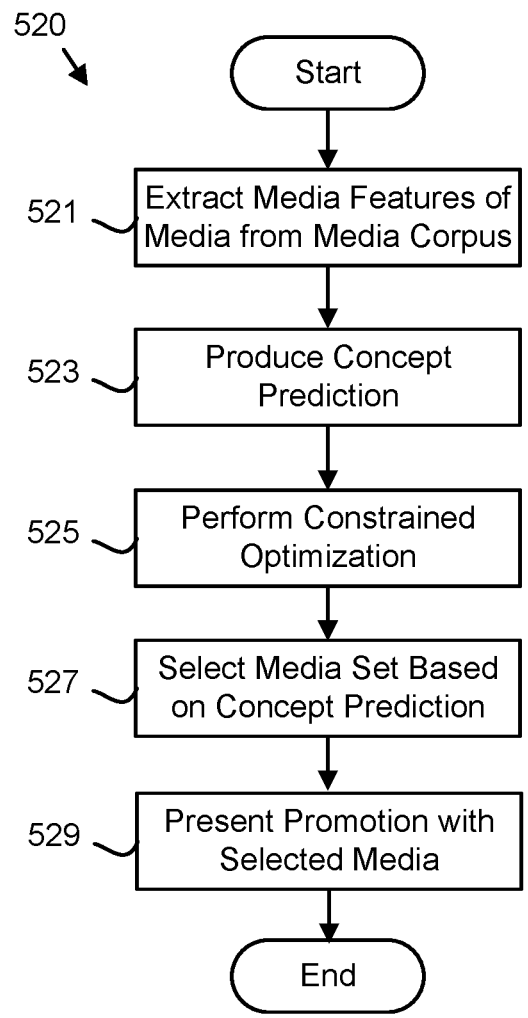
FIG. 5B is a flow chart diagram illustrating one embodiment of a media selection method.

FIG. 5B is a flow chart diagram illustrating one embodiment of a media selection method 520. The method 520 may select the media set 107 from the media corpus 101 using the review model 105. The method 520 may be performed by the processor 405 and/or neural network 475.

The method 520 starts, and in one embodiment, the processor 405 extracts 521 the media features 317 from the media 115 of the media corpus 101. The processor 405 may perform an automated review of the media 115 to extract 521 the media features 317. The extraction 521 of the media features 317 is described in more detail in FIG. 5H.

The processor 405 may produce 523 the concept prediction 309 using the review model 105. The concept prediction 309 may be produced 523. The concept prediction 309 may be produced 523 by predicting the concept prediction 309. In one embodiment, the media features 317 for each medium 115 are presented to the review model 105 and the review model 105 predicts 523 the concept prediction 309 based on the media features 317. In a certain embodiment, the production review model 105 is employed.

The processor 405 may perform 525 a constrained optimization calculation for presenting the media 115. The constrained optimization calculation may optimize the objective function 227 for the budget requirements 221, the placement number 223, and the desired spend 225 to generate the constrained optimization 229. The constrained optimization calculation is described in more detail in FIG. 5F.

The processor 405 may select 527 media 115 based on the predicted concept prediction 309 for the media set 107. In one embodiment, the selection 527 is based on the concept predictions 309 for the media 115 and/or the constraints of the constrained optimization 229. A given medium 115 may be selected 527 based on a concept prediction 309 that the given medium 115 adheres to the brand's intent. In addition, although the concept prediction 309 may indicate that the given medium 115 adheres to the brand's intent, the given medium 115 may not be selected if a forecast cost of the given medium exceeds the constraints of the constrained optimization 229. One embodiment of the selection 527 of the media 115 is described in more detail in FIG. 5G.

The processor 405 may present 529 a promotion 319 with the selected media 115 of the media set 107 and the method 520 ends. In one embodiment, when the selected media 115 is presented to a user, the promotion 319 may also be presented. For example, when the user views a YOU-TUBE® video that is included in the media set 107, a video promotion 319 may also be presented 529.

Figure 5C:
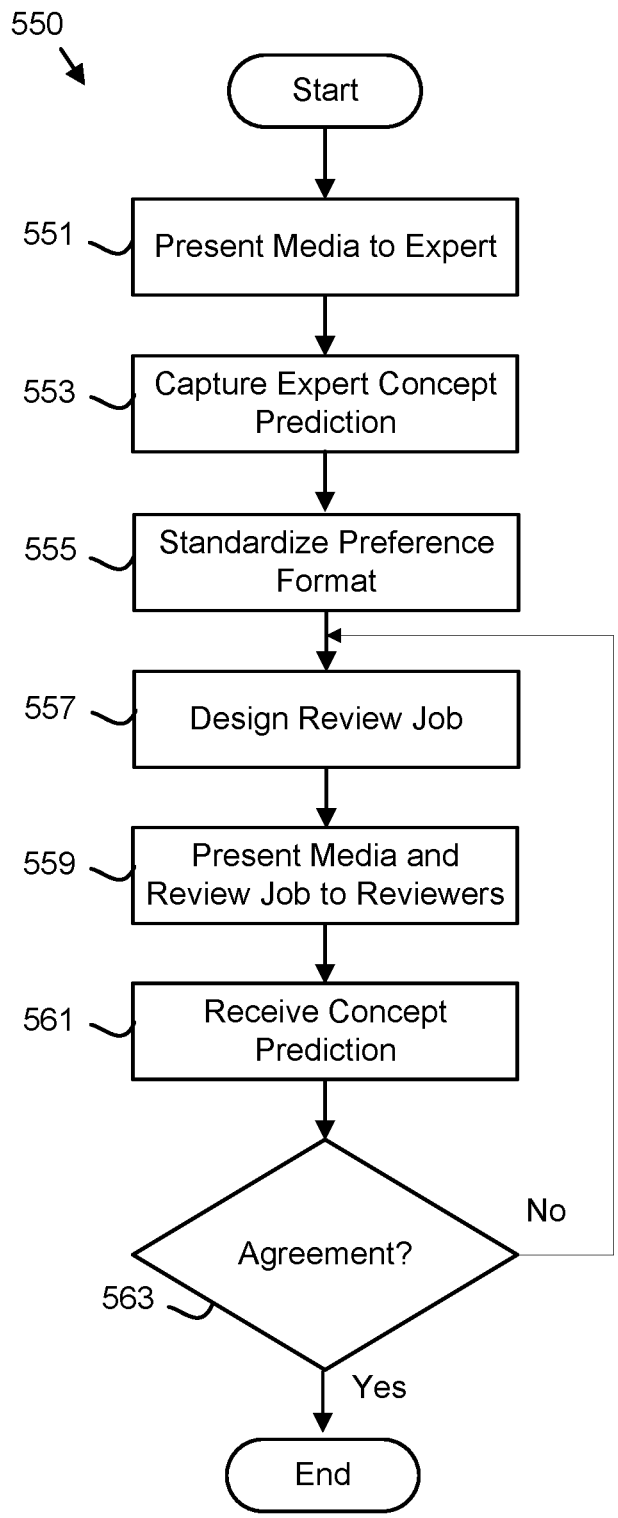
FIG. 5C is a flow chart diagram illustrating one embodiment of a review job generation method.

FIG. 5C is a flow chart diagram illustrating one embodiment of review job generation method 550. The method 550 generates the review job 301. The method 550 may be performed by the processor 405. The method 550 starts, and in one embodiment, the processor 405 presents 551 media 115 of the expert media set 113 to the expert 205. The media 115 may be presented 551 during a meeting between the expert 205 and the moderator 207. In addition, the media 115 may be presented 551 during an online interaction.

The processor 405 may capture 553 the expert concept prediction 313 in response to presenting 551 the media 115. The processor 405 may query the expert 205 with the review question 307 regarding the expert's opinions of the media 115. The expert's opinions may be recorded as the expert concept prediction 313. In addition, the processor 405 may record any initial views on concepts that support a brand that the expert 205 has as the objective description 305. The processor 405 may further query the expert 205 regarding the expert's reasons for the opinions. The reasons may be recorded as the answer description 315.

The processor 405 may standardize 555 the preference format 340 for the expert concept prediction 313. The standardization 555 of the expert's responses using the preference format 340 supports the efficient and accurate generation of the review job 301 by the computer 400. Thus, the preference format 340 enables the automated generation of the review job 301. In one embodiment, each review question 307 that elicits an expert concept prediction 313 is collated into a review set 261 along with the corresponding objective description 305, expert concept prediction 313, and/or answer description 315.

In one embodiment, the expert concept prediction 313 is tested for sentiment. The review question 307 may be determined to have elicited the expert concept prediction 313 if the sentiment of the expert concept prediction 313 exceeds the sentiment threshold 394. The inclusion of a review question 307 and corresponding review set 261 in the preference format 340 based on sentiment improves the accuracy of the preference format 340 in reflecting the expert's opinions regarding the media 115. As a result, the resulting review job 301 is more efficient in gathering reviews 351.

The processor 405 may design 557 the review job 301 and/or review job database 300 based on the plurality of expert concept predictions 313 in the preference format 340. In one embodiment, the review job 301 and/or review job database 300 is based on at least a minimum prediction number of expert concept predictions 313 and/or review jobs 301. The minimum prediction number may be in the range of 50 to 1000. In a certain embodiment, the minimum prediction number is 100.

In one embodiment, the minimum prediction number of expert concept predictions 313 include a minimum positive number of expert concept predictions 313 with a positive review and a minimum negative number of expert concept predictions 313 with a negative review. The minimum positive number and the minimum negative number may be in the range of 30 to 50. The processor 405 may design 557 the review job 301 by selecting the minimum prediction number of review sets 261 and generating corresponding review jobs 301 for each review set 261.

The processor 405 presents 559 the review job 301 to a plurality of reviewers 209 for the expert media set 113. In one embodiment, at least 30 reviewers 209 are presented 559 with the review job 301. In a certain embodiment, the processor 405 presents each medium 115 of the expert media set 113 to the reviewers 209 along with the corresponding review job 301. For example, the processor 405 may present 559 a first medium 115 and the review job 301 with the media identifier 303 for the first medium 115. In a certain embodiment, the first medium 115 is presented 559 to the reviewer 209 and the review question 307 is presented 559 to the reviewer 209. In addition, one or more of the objective description 305, the test question 311, the expert concept prediction 313, the answer description 315, the media features 317, and/or the promotion 319 may be presented 559 to the reviewer 209.

The reviewers 209 answer the review question 307 to the best of their ability. The processor 405 receives 561 the answer as the concept prediction 309. The concept prediction 309 may be stored with the media identifier 303 in a review 351.

The processor 405 may determine 563 whether the agreement threshold 395 is satisfied for concept predictions 309 received from the reviewers 209. The agreement threshold 395 may be satisfied if agreement between the concept predictions 309 received from the reviewers 209 and the expert concept predictions 313 is statistically significant. In addition, the agreement threshold 395 may be satisfied if agreement between the concept predictions 309 received from the reviewers 209 and the expert concept predictions 313 satisfies a Bayesian predictive probability of success.

In one embodiment, the reviewers 209 are asked the test question 311 to determine if the reviewers 209 understand the experts' opinions. Should a reviewer 209 fail to get a sufficient number of test questions 311 correct, the reviewer 209 is removed from the set of reviewers 209 and the reviewer's reviews 351 are removed from the review database 350.

If the agreement threshold 395 is not satisfied, the processor 405 may redesign 557 the review job 301 and/or review job database 300. In one embodiment, review job instances 301 with a lowest match between reviewer concept predictions 309 an expert concept predictions 313 may be removed from the review job 301. The review job 301 may be iteratively redesigned 557 by the processor 405 until the agreement threshold 395 is satisfied.

In response to the agreement threshold 395 being satisfied, the method 550 ends. The review job 301 is validated as reflective of the expert concept predictions 313 of the experts 205 and is ready for deployment to additional reviewers 209 reviewing media 115 from the media corpus 101. The automated design of the review job 301 and review job database 300 uses the preference format 240 to generate review jobs 301 that accurately reflect expert opinions. As a result, the computer 400 is enabled to generate review jobs 301 used for the training of the review model 105.

Figure 5D:
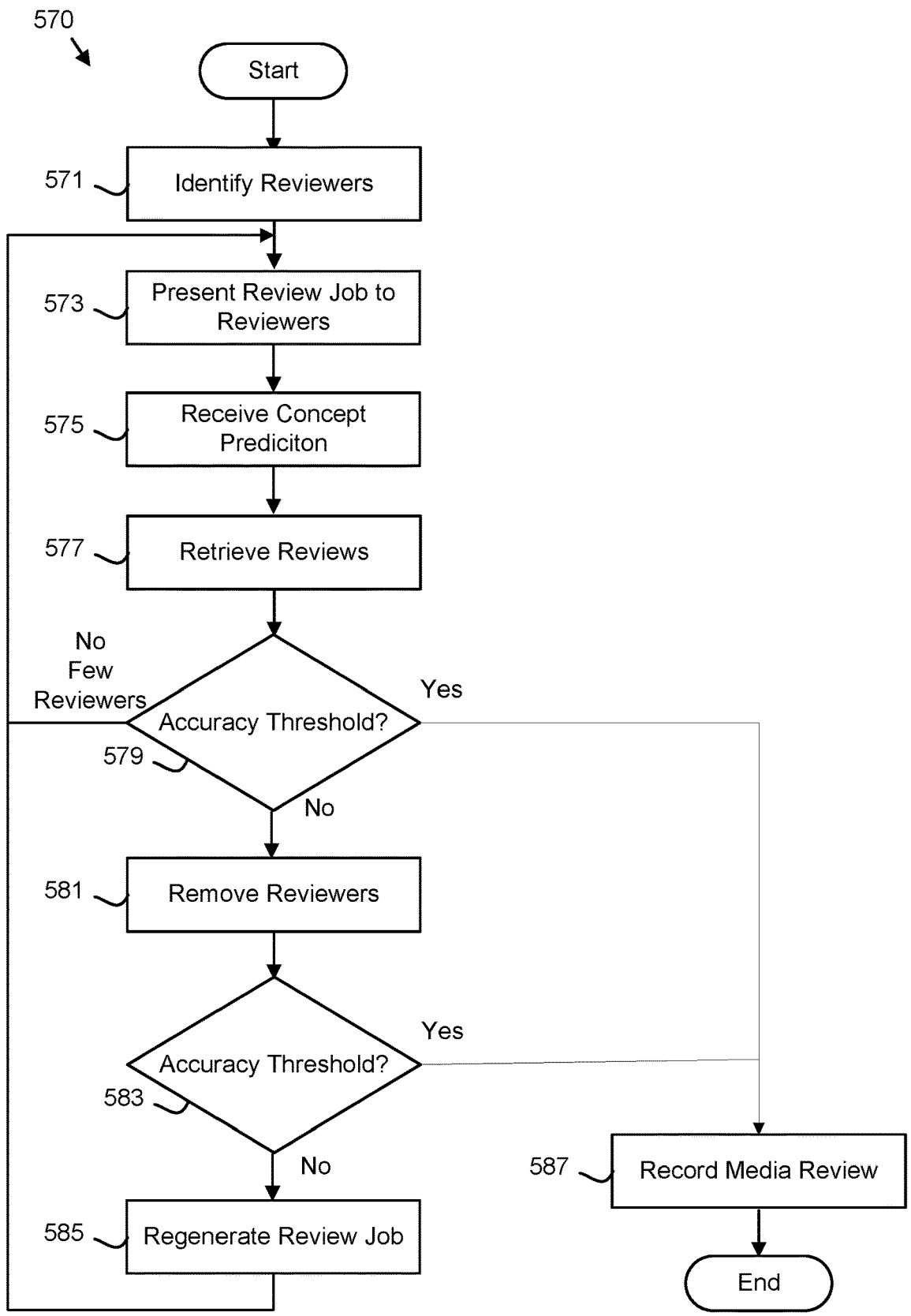
FIG. 5D is a flow chart diagram illustrating one embodiment of a media review generation method.

FIG. 5D is a flow chart diagram illustrating one embodiment of media review generation method 570. The method 570 may record media reviews 371 using the validated review job 301. The method 570 may be performed by the processor 405.

The method 570 starts, and in one embodiment, the processor 405 identifies 571 a plurality of reviewers 209. The plurality of reviewers 209 may be identified 571 based on concept predictions 309 for the review jobs 301 for the expert media set 113. For example, a given reviewer 209 may be identified 571 if the given reviewer's concept predictions 309 satisfy the accuracy threshold 393 when compared with the expert concept predictions 313 for media 115 of the expert media set 113.

The processor 405 further presents 573 the review job 301 to the plurality of reviewers 209. The review job 301 may be presented 573 by displaying the medium 115 identified by the media identifier 303 and by presenting 573 the review question 307. The medium 115 may be selected from the review media set 114 of the media corpus 101. In a certain embodiment, the medium 115 is selected from the expert media set 113. In addition, one or more of the objective description 305, the test question 311, the expert concept prediction 313, the answer description 315, the media features 317, and/or the promotion 319 may be presented 573.

The processor 405 may receive 575 the concept prediction 309 for the review question 307 of the review job 301 from the plurality of reviewers 209 in response to the medium 115 and the review question 307. The media identifier 303 and concept prediction 309 may be stored as a review 351.

The processor 405 may retrieve 577 the plurality of reviews 351 from the review database 350 and determine 579 if concept predictions 309 satisfy the accuracy threshold 393. The accuracy threshold 393 may be satisfied if the probability of a null hypothesis is less than the accuracy threshold 393. In addition, the agreement threshold 395 may be satisfied if a probability given a prior is greater than the accuracy threshold 393. In one embodiment, the accuracy threshold 393 is satisfied if a sufficiently large set of reviewers 209 agree on the concept prediction 309.

In one embodiment, each medium 115 is presented 573 to a small number of reviewers 209. Should the accuracy threshold 393 not be satisfied by few reviewers 209, the same medium 115 may be presented to more reviewers 209 up until a maximum number of reviewers 209 per medium 115 is reached.

If the accuracy threshold 393 is satisfied for the plurality reviewers 209, the processor 405 may record 587 the media review 371 and the method 570 ends. The media review 371 may be recorded 587 with the consensus concept prediction 373. The consensus concept prediction 373 may be an average of the concept predictions 309 from the reviewers 209, a mean of the concept predictions 309, a median of the concept predictions 309, and/or a random sample of the concept predictions 309.

If the accuracy threshold 393 is not satisfied for the plurality of reviewers 209, the processor 405 may remove reviewers 209 from the plurality of reviewers 209. The removed reviewers 209 may have made concept predictions 309 that do not satisfy the accuracy threshold 393. In one embodiment, the removed reviewers 209 made concept predictions 309 that did not agree with the expert concept predictions 313.

The processor 405 may further determine 583 if the accuracy threshold 393 is satisfied for the remaining plurality of reviewers 209. In one embodiment, the processor 405 determines 583 if the accuracy threshold 393 is satisfied for the remaining reviewers 209 after reviewers 209 with concept predictions 309 that did not agree with the expert concept predictions 313 were removed from the plurality of reviewers 209. If the accuracy threshold 393 is still not satisfied, the processor 405 may regenerate 585 the review job 301 and present 573 the regenerated review job 301 to the reviewers 209. The regeneration 585 of the review job 301 may employ the method 550 of FIG. 5C.

If the accuracy threshold 393 is satisfied, the processor 405 may record 587 the media review 371 and the method 570 ends. The method 570 generates media reviews 371 with concept predictions 309 that anticipate the expert concept predictions 313. In addition, the use of the plurality of reviewers 209 allows the recording of sufficient media reviews 371 to train the review model 105 as will be described hereafter.

Figure 5E:
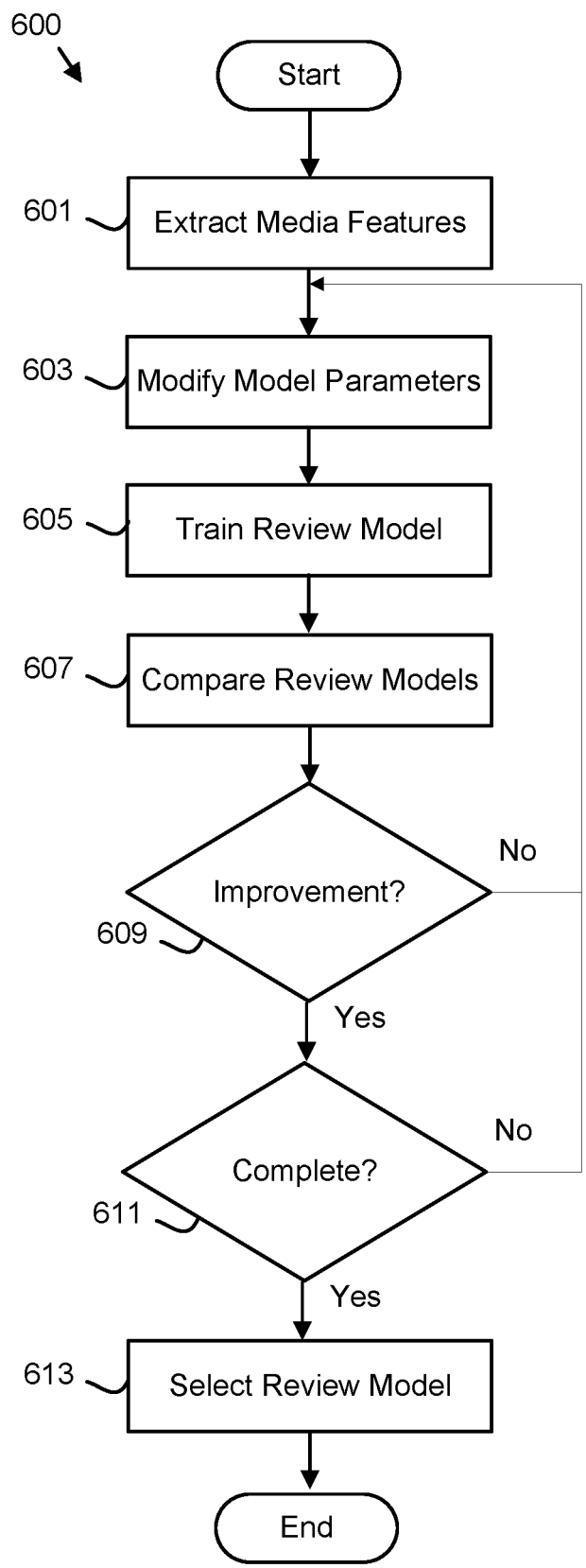
FIG. 5E is a flow chart diagram illustrating one embodiment of a model training method.

FIG. 5E is a flow chart diagram illustrating one embodiment of a model training method 600. The method 600 trains the review model 105 with the media reviews 371. The method 600 may be performed by the processor 405 and/or neural network 475 and/or gradient boosting machines.

The method 600 starts, and in one embodiment, the processor 405 extracts 601 the media features 317 for the media 115 of the media review set 114. The media features 317 may be regularly and/or automatically extracted 601. In a certain embodiment, the media features 317 are automatically extracted 601 daily. In one embodiment, the processor 405 encodes the media category 247, the text description 249, the image 251, the text 253, the video 255, and/or the audio 257. The extraction 601 of the media features 317 is described in more detail in FIG. 5H.

The processor 405 may modify 603 the model parameters 391 for the review model 105. In one embodiment, the modification 603 of the model parameters 391 is directed towards a local optimum. In addition, the modification 603 may be a random perturbation of the model parameters 391. The processor 405 may modify 603 a model type, a model breadth, a model depth, a learning rate, a learning algorithm, a network geometry, and/or a recursion geometry.

The processor 405 may further train 605 a given review model 105 based on the modified model parameters 391. The processor 405 may iteratively apply a learning algorithm to the media reviews 371 for a specified model type based on the model parameters 391.

The processor 405 may compare 607 the given review model 105 to a current review model 105 if the current review model 105 exists. In a certain embodiment, both the given review model 105 and the current review model 105 make predictions of the concept prediction 309 for the expert media set 113. The processor 405 may determine 609 the given review model 105 is an improvement if the concept predictions 309 of the given review model 105 are in closer agreement to the expert concept predictions 313 for the expert media set 113 than the concept predictions 309 of the current review model 105.

If the given review model 105 is not an improvement, the processor 405 again modifies 603 the model parameters 391. The modification 603 may be based on differences between the given review model 105 and the current review model 105. If the given review model 105 is an improvement, the processor 405 determines 611 if optimization of the model parameters 391 is complete. In one embodiment, optimization of the model parameters 391 is complete if repeated perturbations of the model parameters 391 converge on the model parameters 391 for the given review model 105.

If the optimization is not complete, the processor 405 again modifies 603 the model parameters 391. If the optimization is complete, the processor 405 selects 613 the current review model 105 as the trained, optimized review model 105 and the method 600 ends. The method 600 trains and selects the review model 105 that accurately predicts the concept prediction 309 based on the media reviews 371.

Figure 5F:
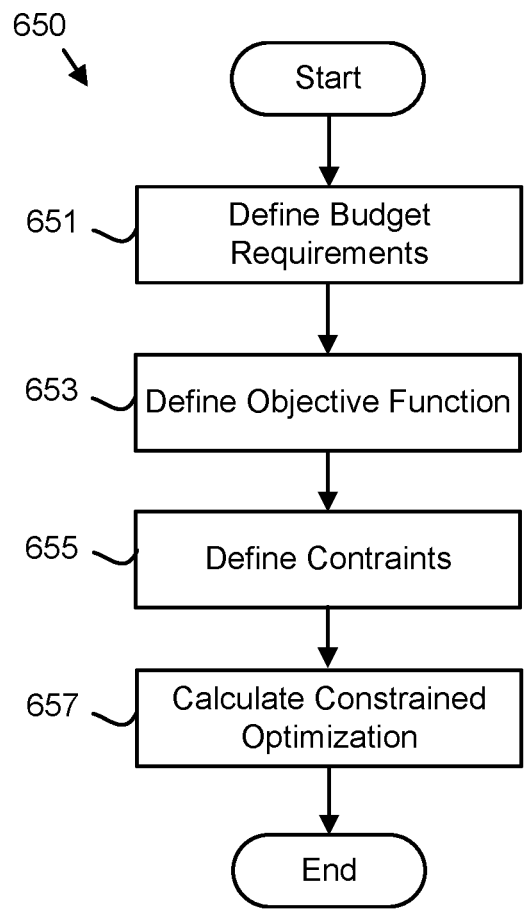
FIG. 5F is a flow chart diagram illustrating one embodiment of a constrained optimization method.

FIG. 5F is a flow chart diagram illustrating one embodiment of constrained optimization method 650. The method 650 performs a constrained optimization calculation for selecting media 115. The method 650 may be performed by the processor 405.

The method 650 starts, and in one embodiment, the processor 405 defines 651 the budget requirements 221 for presenting the promotion 319 with the media 115. The budget requirements 221 may be received from the advertiser. The processor 405 further defines 653 the objective function 227 for presenting the media 115. The processor 405 may define 655 the constraints for the objective function 227. The constraints may be the placement number 223 and/or the desired spend 225 from the budget requirements 221. The processor 405 may further calculate 657 the constrained optimization 227 and the method 650 ends. The constrained optimization 227 may be employed to determine the media 115 for the media set 107 and/or the medium bid 123.

Figure 5G:
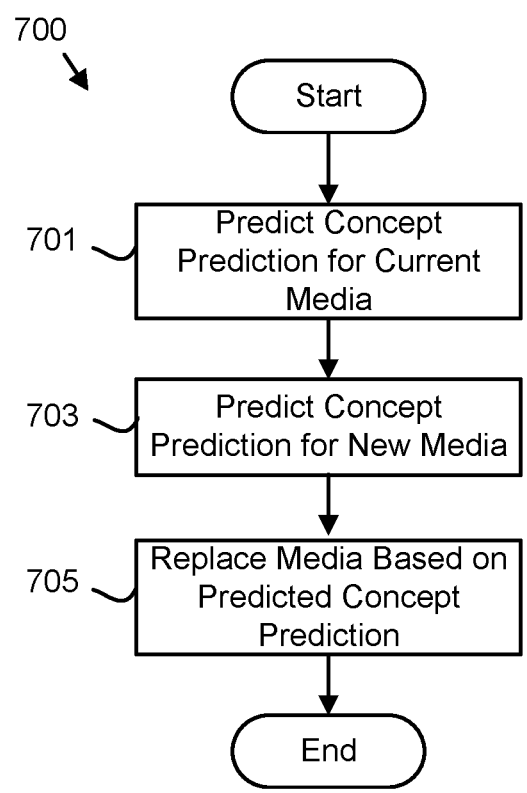
FIG. 5G is a flow chart diagram illustrating one embodiment of a media selection method.

FIG. 5G is a flow chart diagram illustrating one embodiment of media selection method 700. The method 700 may select media 115 for the media set 107 based on predicted concept predictions 309. In a certain embodiment, the method 700 determines whether to replace current media 115 with new media 115 in the media set 107. The promotion 319 may be presented to users along with the media 115 of the media set 107. The method 700 may be performed by the processor 405 and/or the neural network 475 and/or gradient boosting machine.

The method 700 starts, and in one embodiment, the processor 405 predicts 701 the concept prediction 309 for current media 115 in the media set 107. The current media 115 may be already included in the media set 107. The processor 405 may employ the review model 105 to predict 701 the concept prediction 309. The concept prediction 309 may be predicted 701 by applying the media features 317 to the review model 105 and receiving the concept prediction 309 in response to the media features 317.

The processor 405 further predict 703 the concept prediction 309 for the new media 115 using the review model 105. If the concept prediction 309 for the new media 115 indicates that the new media 115 better satisfies the advertiser's brand intent, the processor 405 replaces 705 the current media 115 with the new media 115 and the method 700 ends. The method 700 uses the review model 105 to build the media set 107 of media 115 that satisfies the advertiser's brand intent.

Figure 5H:
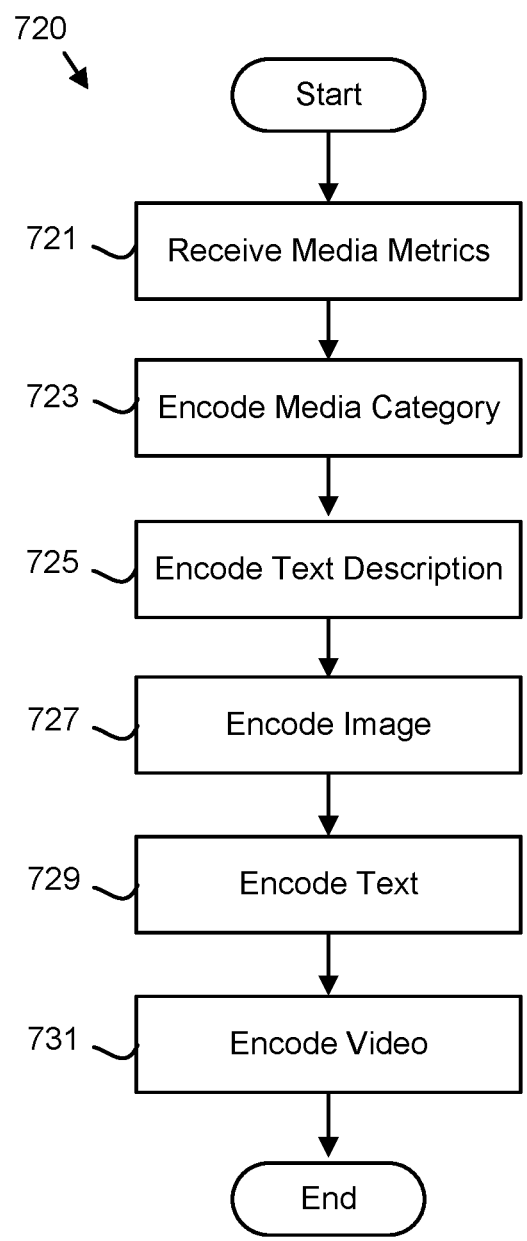
FIG. 5H is a flow chart diagram illustrating one embodiment of a media feature identification method.

FIG. 5H is a flow chart diagram illustrating one embodiment of media feature identification method 720. The method 720 extracts the media features 317 from media 115. The method 720 may be performed by the processor 405 and/or the neural network 475 and/or the gradient boosting machine.

The method 720 starts, and in one embodiment, the processor 405 receives 721 the media metrics 353 for a medium 115. The media metrics 353 may be downloaded from a provider of the medium 115. For example, the media metrics 353 may be downloaded from YOUTUBE® for a YOUTUBE® video medium 115.

The processor 405 may further encode 723 the media category 247 for the medium 115. In one embodiment, the processor 405 employs the neural network 475 to generate a learned embedding from one or more of the media metrics 353, text description 249, image 251, text 253, video 255, and/or audio 257. The media category 247 may be based on the learned embedding. The media category 247 also may be encoded 723 based on keywords from the media metrics 373.

The processor 405 may encode 725 the text description 249 for the medium 115. The processor 405 may employ the neural network 475 to generate a learned embedding from the text 253, video 255, and/or audio 257. The text description 249 may be based on the learned embedding.

In one embodiment, the processor 405 and/or neural network 475 compares the image 251, the text 253, the video 255, and/or the audio 257 to the image 251, the text 253, the video 255, and/or the audio 257 of the media features 317 of other media 115 with the text description 249 of the other media 115. The processor 405 may apply the text description 249 of the other media 115 with images 251, text 253, video 255, and/or audio 257 matching the image 251, the text 253, the video 255, and/or the audio 257 of the medium 115.

The processor 405 and/or neural network 475 may encode 727 the image 251 for the medium 115. The processor 405 and/or neural network 475 may compare the media metrics 353, media category 247, text description 249, text 253, video 255, and/or audio 257 of the other media 115 with the media metrics 253, media category 247, text description 249, text 253, video 255, and/or audio 257 of the medium 115. The processor 405 and/or neural network 475 may further encode 727 the image 251 based on the image 251 of the other media 115 with media metrics 353, media category 247, text description 249, text 253, video 255, and/or audio 257 that mostly closely match the media metrics 353, media category 247, text description 249, text 253, video 255, and/or audio 257 of the medium 115.

The processor 405 and/or neural network 475 may encode 729 the text 253 for the medium 115. The neural network 475 may generate a learned embedding from the video 255 and/or audio 257. The text 253 may be based on the learned embedding.

In one embodiment, the processor 405 and/or neural network 475 may compare the media metrics 353, media category 247, text description 249, image 251, video 255, and/or audio 257 of other media 115 with the media metrics 253, media category 247, text description 249, image 251, video 255, and/or audio 257 of the medium 115. The processor 405 and/or neural network 475 may further encode 729 the text 253 based on the text 253 of the other media 115 with media metrics 353, media category 247, text description 249, image 251, video 255, and/or audio 257 that mostly closely match the media metrics 353, media category 247, text description 249, image 251, video 255, and/or audio 257 of the medium 115.

The processor 405 and/or neural network 475 may encode 731 the video 255 of the media 115 and the method 720 ends. In one embodiment, the neural network 475 generates a learned embedding from the audio 257. The video 255 may be based on the learned embedding.

In one embodiment, the processor 405 and/or neural network 475 may compare the media metrics 353, media category 247, text description 249, image 251, text 253, video 255, and/or audio 257 of other media 115 with the media metrics 253, media category 247, text description 249, image 251, text 253, video 255, and/or audio 257 of the medium 115. The processor 405 and/or neural network 475 may further encode 731 the video 255 based on the video 255 of other media 115 with media metrics 353, media category 247, text description 249, image 251, text 255, and/or audio 257 that mostly closely match the media metrics 353, media category 247, text description 249, image 251, text 253, and/or audio 257 of the medium 115.

Figure 5I:
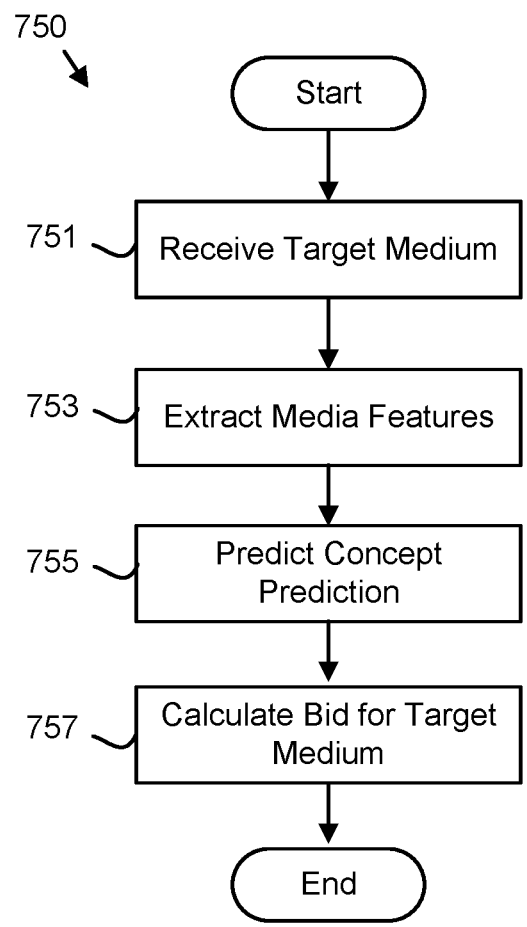
FIG. 5I is a flow chart diagram illustrating one embodiment of a media bidding method.

FIG. 5I is a flow chart diagram illustrating one embodiment of media bidding method 750. The method 750 may generate the medium bid 123. The method 750 may be performed by the processor 405 and/or the neural network 475.

The method 750 starts, and the processor 405 receives a target medium 115 that is scheduled for consumption. For example, the target medium 115 may be a video medium 115 that may be viewed by a user. The processor 405 may further extract 753 the media features 317 from the target medium 115. The media features 317 may be extracted 753 as described in FIG. 5H.

The processor 405 further predicts 755 the concept prediction 309 for the target medium 115. In one embodiment, the processor 405 applies the media features 317 of the target medium 115 to the review model 105. The processor 405 further receives the concept prediction 309 from the review model 105.

The processor 405 calculate 757 a bid for the target medium 115 based on the concept prediction 309. As a result, the processor 405 is able to bid higher for target media 115 that satisfies and advertisers brand intent, enhancing the calculation of the bid.

The embodiments automate the generation and validation of a review job 301 that enables a large number of reviewers 209 to review a large reviewer media set 114, generating sufficient reviews 350 for training the review model 105. The review model 105 makes concept predictions 309 that closely match the expert concept predictions 313, enabling a large number of media 115 from the media corpus 101 to be efficiently and accurately reviewed by the computer 400, improving the efficiency of the computer 400.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
generating, by use of a processor, a review job comprising at least one review question and a corresponding expert concept prediction for an expert media set that is a subset of a media corpus;
generating media reviews from a plurality of reviewers using the review job for the expert media set;
extracting media features for media of the media reviews;
training a review model with the media reviews and corresponding media features;
producing the concept prediction for media of the media corpus using the review model; and
selecting media based on the predicted concept prediction for a media set.

2. The method of claim 1, wherein generating the review job comprises:
presenting media of the expert media set to an expert;
capturing the expert concept prediction;
standardizing a preference format for the expert concept prediction; and designing the review job based on a plurality of expert concept predictions.

3. The method of claim 2, wherein generating the review job further comprises:
presenting the review job to a plurality of reviewers;
determining whether an agreement threshold is satisfied for concept predictions received from the reviewers; and
redesigning the review job in response to the agreement threshold not being satisfied.

4. The method of claim 1, wherein generating the media reviews comprises:
presenting the review job to the plurality of reviewers;
receiving concept predictions for the review question of the review job from the plurality of reviewers;
determining whether the concept predictions satisfy an accuracy threshold; and
recording the media review in response to the accuracy threshold being satisfied, wherein each media review comprises a consensus concept prediction.

5. The method of claim 4, wherein generating the media review further comprises:
regenerating the review job in response to the accuracy threshold not being satisfied for the plurality of reviewers; and
removing reviewers from the plurality of reviewers with concept predictions that do not satisfy the accuracy threshold.

6. The method of claim 4, wherein generating the media reviews further comprises identifying a plurality of reviewers based answers to the review job for the expert media set from the plurality of reviewers.

7. The method of claim 1, wherein generating the training the review model comprises:
extracting media features from media;
modifying model parameters for the review model; and
training a given review model based on the modified model parameters;
comparing the given review model to a current review model; and
selecting the given review model as the current review model in response to improvement.

8. The method of claim 1, the method further comprising performing a constrained optimization calculation for presenting the media.

9. The method of claim 8, wherein performing the constrained optimization calculation comprises:
defining budget requirements for presenting the media;
defining an objective function for presenting the media;
defining constraints comprising a placement number and a desired spend from the budget requirements; and
calculating the constrained optimization.

10. The method of claim 1, the method further comprising presenting a promotion with the selected media.

11. The method of claim 1, the method further comprising:
receiving a target medium;
predicting the concept prediction for the target medium; and
calculating a bid for the target medium based on the concept prediction.

12. The method of claim 1, the method further:
selecting a media sourcing strategy from the group consisting of a random strategy, an active learning strategy, and a targeted strategy, wherein the random strategy selects media at random, the active learning strategy selects media based on the concept prediction and interactive queries directed to reviewers, and the target strategy selects media based on media metrics; and
retraining the review model with media selected using the media sourcing strategy.

13. The method of claim 1, wherein extracting media features comprises:
receiving media metrics for media;
encoding a media category for the media;
encoding a text description for the media;
encoding an image for the media;
encoding text from audio of the media; and
encoding video of the media.

14. An apparatus comprising:
a processor;
a memory that stores code executable by the processor to perform:
generating a review job comprising at least one review question and a corresponding expert concept prediction for an expert media set that is a subset of a media corpus;
generating media reviews from a plurality of reviewers using the review job for the expert media set;
extracting media features for media of the media reviews;
training a review model with the media reviews and corresponding media features;
producing the concept prediction for media of the media corpus using the review model; and
selecting media based on the predicted concept prediction for a media set.

15. The apparatus of claim 14, wherein generating the review job comprises:
presenting media of the expert media set to an expert;
capturing the expert concept prediction;
standardizing a preference format for the expert concept prediction; and
designing the review job based on a plurality of expert concept predictions.

16. The apparatus of claim 15, wherein generating the review job further comprises:
presenting the review job to a plurality of reviewers;
determining whether an agreement threshold is satisfied for concept predictions received from the reviewers; and
redesigning the review job in response to the agreement threshold not being satisfied.

17. The apparatus of claim 14, wherein generating the media reviews comprises:
presenting the review job to the plurality of reviewers;
receiving concept predictions for the review question of the review job from the plurality of reviewers;
determining whether the concept predictions satisfy an accuracy threshold; and
recording the media review in response to the accuracy threshold being satisfied, wherein each media review comprises a consensus concept prediction.

18. The apparatus of claim 17, wherein generating the media review further comprises:
regenerating the review job in response to the accuracy threshold not being satisfied for the plurality of reviewers; and
removing reviewers from the plurality of reviewers with concept predictions that do not satisfy the accuracy threshold.

19. The apparatus of claim 17, wherein generating the media reviews further comprises identifying a plurality of reviewers based answers to the review job for the expert media set from the plurality of reviewers.

20. A program product comprising a non-transitory storage medium storing code executable by the processor to perform:
- generating a review job comprising at least one review question and a corresponding expert concept prediction for an expert media set that is a subset of a media corpus;
- generating media reviews from a plurality of reviewers using the review job for the expert media set;
- extracting media features for media of the media reviews;
- training a review model with the media reviews and corresponding media features;
- producing the concept prediction for media of the media corpus using the review model; and
- selecting media based on the predicted concept prediction for a media set.

* * * * *